United States Patent
Luo et al.

(10) Patent No.: US 10,869,198 B2
(45) Date of Patent: Dec. 15, 2020

(54) WIRELESS SYSTEM ACCESS CONTROL METHOD AND DEVICE

(71) Applicant: Hytera Communications Corporation Limited, Guangdong (CN)

(72) Inventors: Zhenghua Luo, Guangdong (CN); Chia Han Siong Samuel, Guangdong (CN); Yan Xu, Guangdong (CN); Yingzhe Zhang, Guangdong (CN); Jingjing Zhang, Guangdong (CN)

(73) Assignee: Hytera Communications Corporation Limited, Shenzhen (CN)

( * ) Notice: Subject to any disclaimer, the term of this patent is extended or adjusted under 35 U.S.C. 154(b) by 312 days.

(21) Appl. No.: 15/738,326

(22) PCT Filed: Jul. 1, 2015

(86) PCT No.: PCT/CN2015/083027
§ 371 (c)(1),
(2) Date: Feb. 7, 2018

(87) PCT Pub. No.: WO2017/000272
PCT Pub. Date: Jan. 5, 2017

(65) Prior Publication Data
US 2018/0184292 A1  Jun. 28, 2018

(51) Int. Cl.
*H04L 29/06* (2006.01)
*H04W 12/08* (2009.01)
(Continued)

(52) U.S. Cl.
CPC ............ *H04W 12/08* (2013.01); *G06F 11/08* (2013.01); *H04L 9/32* (2013.01); *H04W 12/04* (2013.01);
(Continued)

(58) Field of Classification Search
USPC .......................................................... 726/6
See application file for complete search history.

(56) References Cited

U.S. PATENT DOCUMENTS 5,349,642 A    9/1994  Kingdon
5,481,610 A *  1/1996  Doiron .................. H04L 9/0894
                                                380/270
(Continued)

FOREIGN PATENT DOCUMENTS

CN    1467943 A    1/2004
CN    1536914 A    10/2004
(Continued)

OTHER PUBLICATIONS

International Search Report and Written Opinion for International Application No. PCT/CN2015/083027 dated Mar. 24, 2016 with English translation.
(Continued)

*Primary Examiner* — Amare F Tabor
(74) *Attorney, Agent, or Firm* — Wolf, Greenfield & Sacks, P.C.

(57) ABSTRACT

A wireless access control method and device are provided. A method applied to a sender terminal includes: generating, by a terminal, an authentication code according to a protocol negotiated with a receiver when sending control-type data, combining, by the terminal, control-type data, the authentication code and a corresponding CRC check code to generate a message, and sending, by the terminal, the message to the receiver, such that the receiver can perform a CRC check on the received message, generates an authentication code according to the negotiated protocol if the CRC check is successful, determines whether the generated authentication code is the same as the received authentication code, if
(Continued)

so, analyzes the received control-type data, and if not, discards the received control-type data.

6 Claims, 6 Drawing Sheets

(51) Int. Cl.
    *H04L 9/32*     (2006.01)
    *H04W 12/06*     (2009.01)
    *H04W 12/10*     (2009.01)
    *G06F 11/08*     (2006.01)
    *H04W 12/04*     (2009.01)

(52) U.S. Cl.
    CPC ... *H04W 12/0609* (2019.01); *H04W 12/1006* (2019.01)

(56) References Cited

U.S. PATENT DOCUMENTS

| | | | | |
|---|---|---|---|---|
| 7,716,720 B1 * | 5/2010 | Marek | .................. | G06F 21/74 380/28 |
| 7,774,594 B2 * | 8/2010 | Lopez | ................ | H04L 63/0428 713/153 |
| 7,995,994 B2 * | 8/2011 | Khetawat | ................ | H04M 3/16 455/410 |
| 8,041,335 B2 * | 10/2011 | Khetawat | .............. | H04L 63/104 455/404.2 |
| 8,225,090 B2 * | 7/2012 | You | ........................ | H04L 63/08 713/161 |
| 8,516,232 B2 * | 8/2013 | Dolgunov | ............. | G06F 13/385 370/254 |
| 8,576,785 B2 * | 11/2013 | Keshavarzian | ....... | H04L 63/123 370/329 |
| 8,627,092 B2 * | 1/2014 | Fischer | ................. | H04W 12/06 713/181 |
| 8,881,294 B2 * | 11/2014 | Johnson | .................. | G06F 21/64 726/26 |
| 10,255,623 B2 * | 4/2019 | Chatterton | ......... | G06Q 30/0281 |
| 2007/0050622 A1 * | 3/2007 | Rager | ................... | G06F 21/445 713/168 |
| 2011/0053558 A1 | 3/2011 | Teague | | |
| 2012/0260088 A1 | 10/2012 | Fries et al. | | |
| 2014/0289874 A1 * | 9/2014 | Lee | .................... | G06F 11/1004 726/32 |

FOREIGN PATENT DOCUMENTS

| | | |
|---|---|---|
| CN | 101068196 A | 11/2007 |
| CN | 103929748 A | 7/2014 |
| CN | 104185178 A | 12/2014 |
| EP | 1 610 516 A1 | 12/2005 |
| WO | WO 2013/102003 A1 | 7/2013 |

OTHER PUBLICATIONS

First Office Action for Chinese Application No. 201580000297.4, dated Jul. 3, 2018.

Extended European Search Report for Application No. EP 15896803.2 dated Mar. 8, 2018.

* cited by examiner

WIRELESS SYSTEM ACCESS CONTROL METHOD AND DEVICE

CROSS-REFERENCE TO RELATED APPLICATIONS

The present application is a National Stage application of PCT international patent application No. PCT/CN2015/083027 filed on Jul. 1, 2015, the entire of which is incorporated herein by reference.

FIELD

The present disclosure relates to the technical field of communication, and in particular to a wireless system access control method and a wireless system access control device.

BACKGROUND

An access control for a cluster communication system in a cluster mode is achieved by authenticating a terminal. In this case, it is avoided a problem that an unqualified terminal occupies resources, which affects normal communications between terminals.

In an implementation, the access control method includes the following steps. A system sends challenge information to a terminal under a preset condition. After receiving the challenge information, the terminal firstly calculates an authentication code according to an authentication algorithm negotiated with the system, and then sends the authentication code to the system. The system may firstly calculate an authentication code according to the negotiated authentication algorithm, and then determines whether the received authentication code is the same as the authentication code calculated by the system. The system determines that the terminal is qualified if the received authentication code is the same as the calculated authentication code, and determines that the terminal is unqualified if the received authentication code is not the same as the calculated authentication code.

Generally, the system may authenticate the terminal in the above way only under a preset condition, for example the terminal accesses the network for the first time or the terminal carries a specific service. The system may record the ID and an authentication state of the terminal once authentication of the terminal is successful. In addition, no access control solution is provided in a direct mode operation and a relay mode in conventional technologies.

It is appreciated by the inventor that there are the following problems in the conventional technologies.

In the above system active authentication approach in the conventional technologies, the system needs to interact with the terminal for multiple times, which results in a large air interface overhead. In addition, in the case that authentication of the terminal is successful, the system may, permanently or in a period of time, record that the terminal is qualified. In this case, an unqualified terminal may occupy resources illegally by setting a same ID as the qualified terminal, thereby affecting the communication.

SUMMARY

In order to solve the above technical problems, a wireless system access control method and a wireless system access control device are provided according to the present disclosure. In the method, a sender terminal actively sends an authentication code when initiating a service, to trigger a receiver to authenticate the sender in real time, and processes data only if authentication of the sender is successful. With the method, a real-time authentication can be achieved by performing authentication actively by the terminal, thereby preventing an unqualified terminal from occupying resources in any communication mode and improving the security of a communication between terminals.

A wireless access control method applied to a sender terminal is provided according to a first aspect of the present disclosure. The method includes:

generating, by the terminal, an authentication code according to a protocol negotiated with a receiver, when the terminal sends control-type data; combining, by the terminal, the control-type data, the authentication code and a corresponding CRC check code to generate a message; and sending, by the terminal, the message to the receiver, where the receiver firstly performs a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

A wireless system access control method applied to a receiver is provided according to a second aspect of the present disclosure. The method includes:

receiving a message sent by a sender, where the message carries control-type data, an authentication code and a corresponding CRC check code; performing a CRC check on the message, and generating an authentication code according to a protocol negotiated with the sender if the CRC check is successful; determining whether the generated authentication code is the same as the received authentication code, analyzing the control-type data in the received message if the generated authentication code is the same as the received authentication code, and discarding the received control-type data if the generated authentication code is not the same as the received authentication code.

A wireless access control device applied to a sender terminal is provided according to a third aspect of the present disclosure. The device includes:

an authentication code generation unit configured to generate, when control-type data is sent, an authentication code according to a protocol negotiated with a receiver; a message generation unit configured to combine the control-type data, the authentication code and a corresponding CRC check code to generate a message; a message sending unit configured to send the message to the receiver, where the receiver firstly performs a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

A wireless system access control device applied to a receiver terminal is provided according to a fourth aspect of the present disclosure. The device includes:

a message receiving unit configured to receive a message sent by a sender, where the message carries control-type data, an authentication code and a corresponding CRC check code; a CRC check unit configured to perform a CRC check on the message, and trigger an authentication code generation unit and an authentication unit if the CRC check is successful; the authentication code generation unit configured to generate an authentication code according to a protocol negotiated with the sender; and the authentication unit configured to determine whether the generated authentication code is the same as the authentication code in the received message, analyze the control-type data in the received message if the generated authentication code is the same as the received authentication code, and discard the received control-type data if the generated authentication code is not the same as the received authentication code.

A wireless system access control device is provided according to a fifth aspect of the present disclosure. The device includes at least one processor, at least one network interface or a communication interface, a memory and at least one communication bus. The memory is configured to store program instructions. In response to the program instructions, the processor is configured to:

generate an authentication code according to a protocol negotiated with a receiver, when control-type data is sent; combine the control-type data, the authentication code and a corresponding CRC check code to generate a message; and send the message to the receiver, where the receiver firstly performs a CRC check on the received message, generates an authentication code according to the negotiated protocol if the CRC check is successful, determines whether the generated authentication code is the same as the received authentication code; analyzes the received control-type data if the generated authentication code is the same as the received authentication code, and discards the received control-type data if the generated authentication code is not the same as the received authentication code.

A wireless system access control device is provided according to a sixth aspect of the present disclosure. The device includes at least one processor, at least one network interface or a communication interface, a memory and at least one communication bus. The memory is configured to store program instructions. In response to the program instructions, the processor is configured to:

receive a message sent by a sender, where the message carries control-type data, an authentication code and a corresponding CRC check code; perform a CRC check on the message, and generate an authentication code according to a protocol negotiated with the sender if the CRC check is successful; and determine whether the generated authentication code is the same as the authentication code in the received message, analyze the control-type data in the received message if the generated authentication code is the same as the received authentication code, and discard the received control-type data if the generated authentication code is not the same as the received authentication code.

Compared with conventional technologies, the technical solutions of the present disclosure have the following beneficial effects.

In the present disclosure, when sending control-type data, a terminal firstly generates an authentication code according to a protocol negotiated with a receiver, combines the control-type data, the authentication code and a corresponding CRC check code to generate a message, and finally sends the message to the receiver. In this case, the receiver performs a CRC check on the received message, generates an authentication code according to the negotiated protocol if the CRC check is successful, and determines whether the generated authentication code is the same as the received authentication code. The receiver analyzes the received control-type data if the generated authentication code is the same as the received authentication code, and discards the received control-type data if the generated authentication code is not the same as the received authentication code. In such way that the terminal actively sends the authentication code, the system can authenticate the terminal in real time when communicating with the terminal. Although an unqualified terminal has the same ID as the qualified terminal, the unqualified terminal cannot obtain the terminal-active-initiating authentication mechanism and cannot know both generation and sending ways of the authentication code. Therefore, in the present disclosure, the unqualified terminal can be prevented from occupying resources and the security of the communication can be ensured. In addition, since the terminal sends the authentication code while sending the control-type information, the authentication process is performed simultaneously with the control-type information processing, without separate signaling and overheads.

BRIEF DESCRIPTION OF THE DRAWINGS

The drawings to be used in the description of the embodiments of the present disclosure or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

To make the objects, features and advantages of the present disclosure more apparent and easier to be understood, technical solutions of the embodiments of the present disclosure are illustrated in conjunction with the drawings in the embodiments of the present disclosure hereinafter. It is apparent that the described embodiments are only a few rather than all of the embodiments according to the present disclosure. Any other embodiments obtained by those skilled in the art based on the embodiments in the present disclosure without any creative work fall in the protection scope of the present disclosure.

Figure 1:
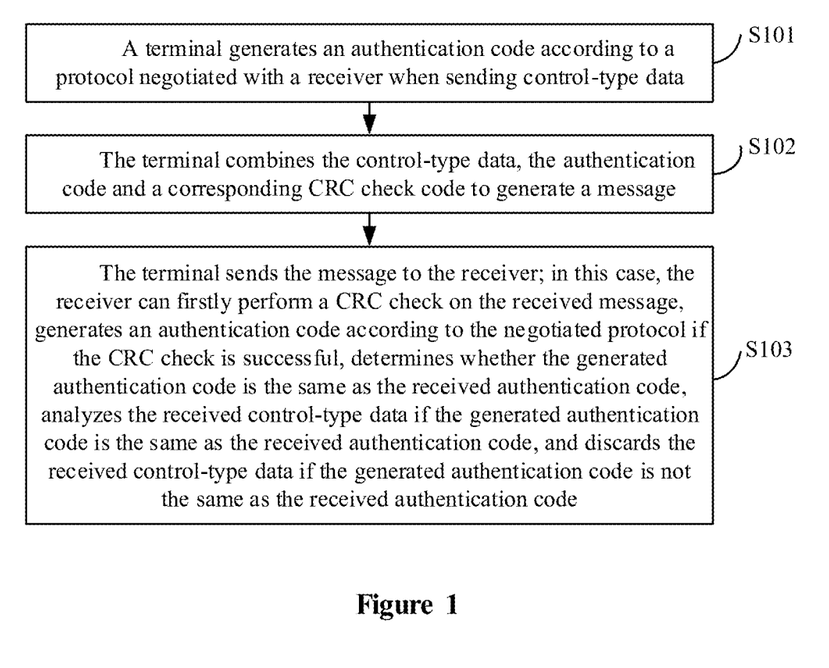
FIG. 1 is a first flowchart of a wireless access control method for a sender terminal according to the present disclosure.

Reference is made to FIG. 1, which is a first flowchart of a wireless access control method for a sender terminal according to the present disclosure. The method is applied to a sender terminal. The method may adapt to a relay mode, a direct mode operation and a cluster mode. As shown in FIG. 1, the method may include steps S101 to S103.

In step S101, the terminal generates an authentication code according to a protocol negotiated with a receiver when sending control-type data.

The terminal herein is any device having a sending function in a private network, such as an interphone. The control-type data herein is data carried in a control-type message in the conventional technologies. The control-type message generally includes two portions: data and Cyclic Redundancy Check (CRC). The data generally includes information such as a source ID, a target ID and a service identifier. The terminal needs to firstly send the control-type message once the terminal initiates any communication service. In this way, the receiver can perform a CRC check on the control-type message, and perform corresponding processing on subsequent service data only if the CRC check is successful. In the present disclosure, the CRC check mechanism is used, that is, the authentication code is carried in the control-type message, thereby authenticating the sender terminal in real time.

The private network communication system supports the relay mode, the direct mode operation and the cluster mode. Hereinafter, the three communication modes and implementations of the embodiment in the three communication modes are described.

In the cluster communication mode, the sender terminal communicates with a receiver terminal via a base station. In the case that the solutions of the present disclosure are implemented in this mode, the receiver mentioned in this step may be the base station of the system or the receiver terminal.

In the relay mode, the sender terminal needs to communicate with a receiver terminal via a relay station having a relay function. In the case that the solutions of the present disclosure are implemented in this mode, the receiver mentioned in this step may be the relay station or the receiver terminal.

In the direct mode operation, the sender terminal directly communicates with a receiver terminal. In the case that the solutions of the present disclosure are implemented in this mode, the receiver mentioned in this step can only be the receiver terminal.

This step may be implemented in the following four modes.

In a first mode, when sending the control-type data, the terminal generates an authentication code based on data which is set in the protocol negotiated with the receiver.

In the first mode, the protocol needs to be pre-negotiated by the sender and the receiver, and data serving as the authentication code is set in the protocol. In this way, the sender directly takes the data which is set in the protocol as the authentication code.

In a second mode, when sending the control-type data, the terminal generates the authentication code by calculating with the control-type data based on an authentication algorithm and an authentication key which are both set in the protocol negotiated with the receiver.

In the second mode, the sender and the receiver need to pre-negotiate the authentication algorithm, the authentication key and data with which calculation is performed, and pre-negotiate that a calculation result is taken as an authentication code. The authentication key is not transmitted via an air interface to ensure the security of the protocol contents. For example, it may be negotiated in the protocol that calculation is performed with all the control-type data or a specific bit of the control-type data.

In a third mode, when sending the control-type data, the terminal generates the authentication code by calculating with a received authentication random number based on an authentication algorithm and an authentication key which are both set in the protocol negotiated with the receiver. The authentication random number is broadcasted by a base station or a relay station according to a preset rule.

In the third mode, the sender and the receiver need to pre-negotiate the authentication algorithm, the authentication key and calculating with the authentication random number, and pre-negotiate that a calculation result is taken as an authentication code. In addition, the sender and the receiver need to receive, in real time, the authentication random number broadcasted by the base station or the relay station according to a certain rule.

In a fourth mode, when sending the control-type data, the terminal generates the authentication code by calculating with a received authentication random number and the received control-type data, based on an authentication algorithm and an authentication key which are both set in the protocol negotiated with the receiver. The authentication random number is broadcasted by a base station or a relay station according to a preset rule.

In the fourth mode, the sender and the receiver need to pre-negotiate the authentication algorithm, the authentication key and calculating with the authentication random number and data in the message, and pre-negotiate that a calculation result is taken as an authentication code. In addition, the sender and the receiver need to receive, in real time, the authentication random number broadcasted by the base station or the relay station according to a certain rule.

In S102, the terminal combines the control-type data, the authentication code and a corresponding CRC check code to generate a message.

In the present disclosure, two modes are provided according to present disclosure, for a mechanism of how to combine the authentication code into a control-type message.

In a first mode, the terminal stores the authentication code by occupying a bit of the control-type data in a message to be generated, generates a CRC check code based on the control-type data and/or the authentication code, and combines the control-type data, the authentication code and the CRC check code to generate the message.

In the first mode, the terminal only generates one message which may be considered as adding an authentication code in the original control-type message, to achieve an authentication mechanism for a CRC check mechanism. In a second mode, the terminal generates a CRC check code for the control-type data based on the control-type data and combines the control-type data and the CRC check code for the control-type data to generate a message, and generates a CRC check code for the authentication code based on the authentication code and combines the authentication code and the CRC check code for the authentication code to generate a message.

In the second mode, two messages are generated by the terminal, with one message being a conventional control-type message and the other message being a message carrying the authentication code. When sending the two messages, the terminal may send the message carrying the authentication code before or after sending the control-type message.

Practically, the above first mode includes three implementations.

In an implementation 1, the terminal stores the authentication code by occupying preset bits of a source ID and a target ID in a message to be generated, generates the CRC check code based on the control-type data and/or the authentication code, and combines the control-type data, the authentication code and the CRC check code to generate the message. In the following, the implementation 1 is described with examples.

In the conventional technologies, since the number of terminals increase continuously, the number of bits occupied by the source ID and the target ID contained in the data in the control-type message is definitely limited, and the source ID and target ID each are allocated with 24 bits. It is appreciated by the inventor by analyzing actual application scenarios of private network communications that, in a general private network communication, at most thousands to ten thousand of terminals are supported, and in most cases, only hundreds to thousands of terminals are supported. Therefore, it is proposed by the inventor to reduce the number of bits occupied by the source ID and the target ID, to release idle bits for storing an authentication code. For example, in order to meet requirements on the number of actual users and implement the present disclosure well, the original source ID and target ID may be respectively compressed from 24 bits to 16 bits which can support 65535 users and completely meet the communication requirement, and the 16 bits released by the compression are used to store the authentication code.

Practically, the above idle bits of 16 bits are only exemplary, and the idle bits may be reasonably set based on an application scenario in an implementation.

In an implementation 2, the terminal stores the authentication code by occupying a bit of a source ID in a message to be generated, generates the CRC check code based on the control-type data and/or the authentication code, and combines the control-type data, the authentication code and the CRC check code to generate the message.

In an implementation 3, the terminal stores the authentication code by occupying a preset bit of data in a message to be generated, generates the CRC check code based on the control-type data and/or the authentication code, and combines the control-type data, the authentication code and the CRC check code to generate the message.

In practice, the process of generating the CRC check code based on the control-type data and/or the authentication code, described in the above three implementations may include: generating a CRC check code only based on the control-type data, generating a CRC check code only based on the authentication code, or generating CRC check codes based on the control-type data and the authentication code, which is the most preferable.

In step S103, the terminal sends the message to the receiver. In this case, the receiver can firstly perform a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

It can be seen from the above embodiment that, in the present disclosure, when sending control-type data, a terminal generates an authentication code according to a protocol negotiated with a receiver, combines the control-type data, the authentication code and a corresponding CRC check code to generate a message, and sends the message to the receiver. In this case, the receiver performs a CRC check on the received message, generates an authentication code according to the pre-negotiated protocol if the CRC check is successful, and determines whether the generated authentication code is the same as the received authentication code. The receiver analyzes the received control-type data if the generated authentication code is the same as the received authentication code, and discards the received control-type data if the generated authentication code is not the same as the received authentication code. In such way that the terminal actively sends the authentication code, the system can authenticate the terminal in real time when communicating with the terminal. Although an unqualified terminal has the same ID as the qualified terminal, the unqualified terminal cannot obtain the terminal-active-initiating authentication mechanism and cannot know both generation and sending ways of the authentication code. Therefore, in the present disclosure, the unqualified terminal can be prevented from occupying resources and the security of the communication can be ensured. In addition, since the terminal sends the authentication code while sending the control-type information, the authentication process is performed simultaneously with the control-type message processing, without separate signaling and overheads.

Figure 2:
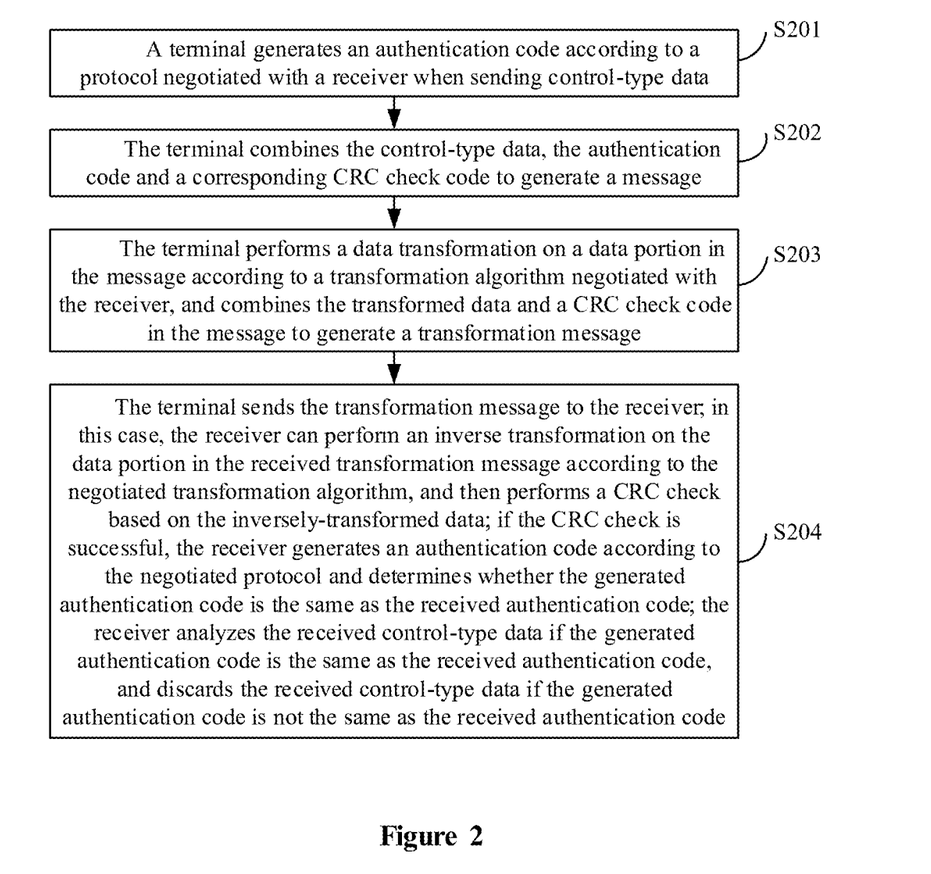
FIG. 2 is a second flowchart of a wireless access control method for a sender terminal according to the present disclosure.

Reference is made to FIG. 2, which is a second flowchart of a wireless access control method for a sender terminal according to the present disclosure. The method is applied to a sender terminal. The method may adapt to a relay mode, a direct mode operation and a cluster mode. FIG. 2 is different from FIG. 1 in that: a data transformation is added after the terminal generates a message by combining the control-type data, the authentication code and the corresponding CRC check code, the transformed data and the CRC check code for the original data are combined to generate a transformation message, and finally the transformation message is sent to the receiver. In this way, complexities of the whole CRC check and authentication are increased, thereby further ensuring the security of the communication.

As shown in FIG. 2, the method may include steps S201 to S204.

In step S201, when sending control-type data, a terminal generates an authentication code according to a protocol negotiated with a receiver.

In step S202, the terminal combines the control-type data, the authentication code and a corresponding CRC check code to generate a message.

Steps S201 and S202 in the embodiment are the same as steps S101 and S102 in the above embodiment. Therefore, for S201 and S202, one may refer to the above corresponding descriptions and the contents are not described here.

In step S203, the terminal performs a data transformation on a data portion in the message according to a transformation algorithm negotiated with the receiver, and combines the transformed data and a CRC check code in the message to generate a transformation message.

It should be noted that, a message may be considered to include a CRC check portion and a data portion. Therefore, in the message, a portion other than the CRC check portion is the data portion. In the case that the message is generated in S202, in step S203, a data transformation is firstly performed on a data portion in the message, and then the transformed data and the CRC check code in the message are recombined to generate a transformation message.

If the terminal generates a message in the first mode mentioned in step S102 of the above embodiment, one message is generated. The message includes control-type data, an authentication code and a CRC check code, and a data portion in the message includes the control-type data and the authentication code.

If the terminal generates a message in the second mode mentioned in step S102 of the above embodiment, two messages are generated. A data portion in one of the two messages only includes an authentication code, and a data portion in the other of the two messages only includes control-type data.

Hereinafter, it is described by assuming that a message carrying an authentication code is generated in the first mode. An implementation of step S203 is described with reference to FIG. 3.

Figure 3:
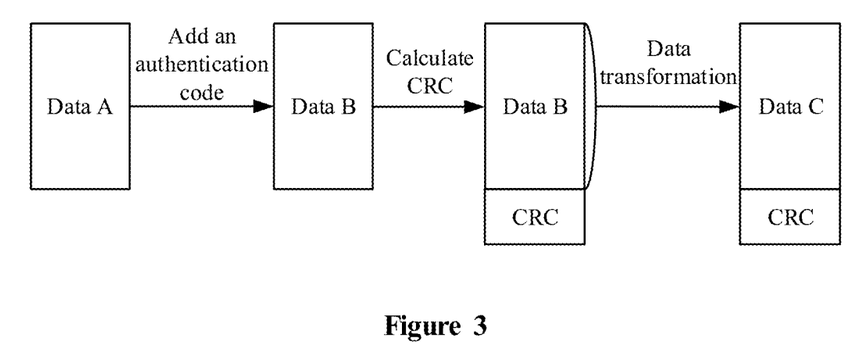
FIG. 3 is a schematic diagram showing a data transformation and a message structure according to the present disclosure.

FIG. 3 is a schematic diagram showing a data transformation and a message structure. In the figure, data A indicates control-type data, data B includes the control-type data and an authentication code, a message generated by combining data B and a CRC check code is the message in the above step S202, data B is transformed to generate data C, and data C contains the transformed control-type data and the transformed authentication code while the CRC check code is not changed. Data C and the CRC check code are combined to generate a transformation message.

The transformation algorithm herein may be an encryption algorithm, a mathematical computation rule or the like. The transformation algorithm and a corresponding inverse transformation algorithm are pre-stored by the sender and the receiver. Alternatively, a mathematical computation rule and a mathematical computation analysis algorithm are pre-stored by the sender and the receiver. Therefore, it is ensured that the receiver can analyze the transformed data sent by the sender according to a negotiated method.

In an implementation, a data transformation may be performed on the control-type data and the authentication code in the message, in conjunction with the CRC check code and/or a transformation random number in the message, by using a transformation key negotiated with the receiver, according to a negotiated transformation algorithm.

The transformation random number herein is broadcasted by a base station or a relay station according to a preset rule. The transformation random number herein may be the same as or different from the above authentication random number. The transformation key herein may be the same as or different from the authentication key mentioned above.

In step S204, the terminal sends the transformation message to the receiver. In this case, the receiver can firstly perform an inverse transformation on the data portion in the received transformation message according to the negotiated transformation algorithm, and then performs a CRC check based on the inversely-transformed data. If the CRC check is successful, the receiver generates an authentication code according to the negotiated protocol and determines whether the generated authentication code is the same as the received authentication code. The receiver analyzes the received control-type data if the generated authentication code is the same as the received authentication code, and discards the received control-type data if the generated authentication code is not the same as the received authentication code.

It can be seen from the above embodiments that, in the present disclosure, in the way that the terminal actively sends the authentication code, the system can authenticate the terminal in real time when communicating with the terminal. Although an unqualified terminal has the same ID as the qualified terminal, the unqualified terminal cannot obtain the terminal-active-initiating authentication mechanism and cannot know both generation and sending ways of the authentication code. Therefore, in the present disclosure, the unqualified terminal can be prevented from occupying resources and the security of the communication can be ensured. In addition, since the terminal sends the authentication code while sending the control-type information, the authentication process is performed simultaneously with the control-type information processing, without separate signaling and overheads. Moreover, a data transformation is performed on a data portion other than a CRC check portion in a message, before the message is sent. In this case, a complexity of the CRC check is increased, thereby increasing the complexity of the whole authentication process and further improving the reliability of the authentication.

In the above, the technical solutions for the sender terminal according to the present disclosure are described above. Hereinafter, the technical solutions for the receiver according to the present disclosure are described.

Figure 4:
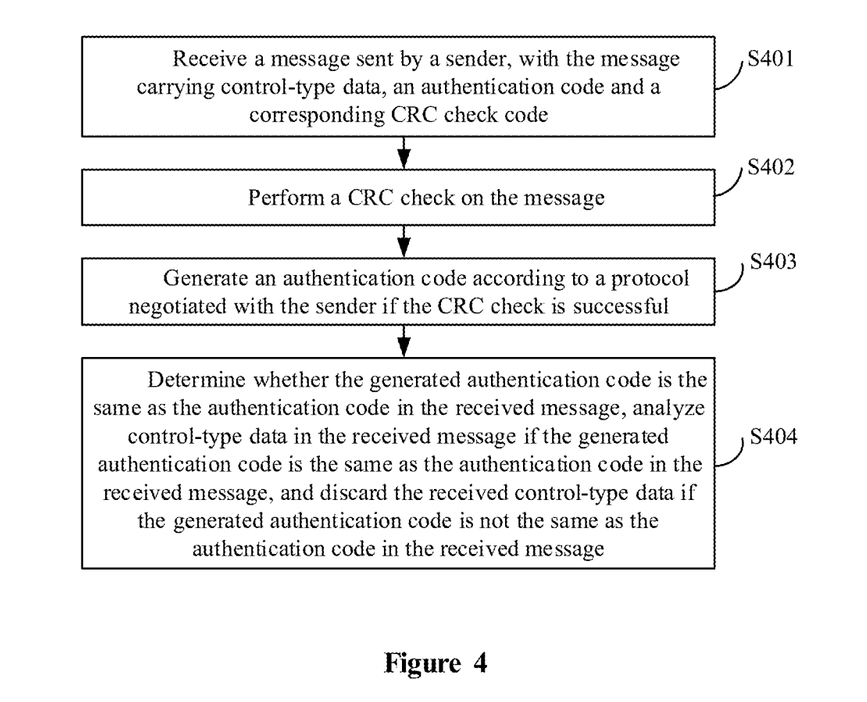
FIG. 4 is a flowchart of a wireless access control method for a receiver terminal according to the present disclosure.

Reference is made to FIG. 4, which is a flowchart of a wireless access control method for a receiver terminal according to the present disclosure. The method is applied to a receiver device, and may adapt to a relay mode, a direct mode operation and a cluster mode. The receiver device may be different in different communication modes. As described above, the receiver may be a relay station or a terminal in the relay mode, may be a base station or a terminal in the cluster mode and can only be a terminal in the direct mode operation. Therefore, an executive subject (the receiver) is not limited in the embodiment, and may be determined based on an application scenario. As shown in FIG. 4, the method may include steps S401 to S404.

In step S401, a message sent by a sender is received. The message carries control-type data, an authentication code and a corresponding CRC check code.

In step S402, a CRC check is performed on the message. If the CRC check is successful, steps S403 and S404 are performed.

Firstly, it should be briefly illustrated that, the embodiment is achieved based on the following condition. The condition includes: a protocol is pre-negotiated by the sender and the receiver; a transmission mechanism and an authentication mechanism in the embodiment are defined in the protocol; the receiver may authenticate, in the above mechanisms, the sender when performing a service; if authentication of the sender is successful, it is determined that the sender is qualified and the received data is processed continuously; if the authentication of the sender is unsuccessful, it is determined that the sender is unqualified and the received data is directly discarded. In this way, the receiver is prevented from receiving a call from an unqualified terminal, thereby improving the security of the communication.

In the case that a control-type message sent by the sender is received, the receiver firstly performs a CRC check on the message. The CRC check includes the following process:

the receiver generates a CRC check code based on data in the message according to a protocol negotiated with the sender, determines whether the generated CRC check code is the same as a CRC check code in the message, and determines that the CRC check is successful if the generated CRC check code is the same as the CRC check code in the message.

For example, in the protocol negotiated by the receiver and the sender, a generation rule of the CRC check code is defined as: calculating a CRC check code based on control-type data according to a CRC generation algorithm, or calculating a CRC check code based on preset constant data according to a CRC generation algorithm. If the sender and the receiver both generate CRC check codes according to the negotiated rule, the receiver firstly generates a CRC check code according to the negotiated rule once receiving the message sent by the sender, and then compares the generated CRC check code with the CRC check code sent by the sender. If the two CRC check codes are the same, it can be determined that the CRC check on the sender is successful, and an authentication is to be performed on the sender subsequently.

If it is defined in the protocol negotiated by the sender and the receiver that the sent control-type message is a transformation message, the CRC check on the message includes the following step.

An inverse transformation is performed on a data portion in the received transformation message according to a transformation algorithm negotiated with the sender, and the CRC check is performed based on the inversely-transformed data.

In S403, an authentication code is generated according to the protocol negotiated with the sender if the CRC check is successful.

In S404, it is determined whether the generated authentication code is the same as the authentication code in the received message. The control-type data in the received message is analyzed if the generated authentication code is the same as the authentication code in the received message, and the received control-type data is discarded if the generated authentication code is not the same as the authentication code in the received message.

It cannot be completely determined that the sender is qualified with the above CRC check, and an authentication is further to be performed. In the authentication process, corresponding steps still need to be performed according to the protocol negotiated with the sender. It should be understood that, only a qualified sender can perform processing and send a control-type message according to the negotiated protocol, while an unqualified sender does not know the contents of the negotiated protocol. In this case, the receiver can perform a check and an authentication according to the negotiated protocol to identify the unqualified sender, thereby determining whether to perform a subsequent analysis on the received data.

The above process of generating the authentication code according to the protocol negotiated with the sender corresponds to the processing performed by the sender described above. The processing performed by the receiver may include:

generating the authentication code based on data which is set in the protocol negotiated with the sender;

generating the authentication code by calculating with the control-type data, based on an authentication algorithm and an authentication key which are both set in the protocol negotiated with the sender;

generating the authentication code by calculating with a received authentication random number, based on an authentication algorithm and an authentication key which are both set in the protocol negotiated with the sender, where the authentication random number is broadcasted by a base station or a relay station according to a preset rule; or generating the authentication code by calculating with a received authentication random number and the received control-type data, based on an authentication algorithm and an authentication key which are both set in the protocol negotiated with the sender, where the authentication random number is broadcasted by a base station or a relay station according to a preset rule.

It can be seen from the above embodiment that, in the present disclosure, once receiving a control-type message sent by a sender, a receiver firstly performs a CRC check on the message according to a protocol negotiated with the sender, and further performs an authentication on the sender if the CRC check is successful. With the double verification, it is ensured that the sender is qualified and the receiver only receives a call really related to the receiver. The unqualified terminal is prevented from occupying resources by the receiver according to the present disclosure, thereby ensuring the security of the communication. In addition, the receiver performs the CRC check and authentication once receiving the control-type message, and it is ensured that an effective authentication is performed for all communication services in real time. Moreover, the authentication process is performed simultaneously with the CRC check process without any additional signaling overhead, thereby saving an authentication cost.

In the above, methods according to the present disclosure are illustrated, and a device according to the present disclosure is illustrated below.

Figure 5:
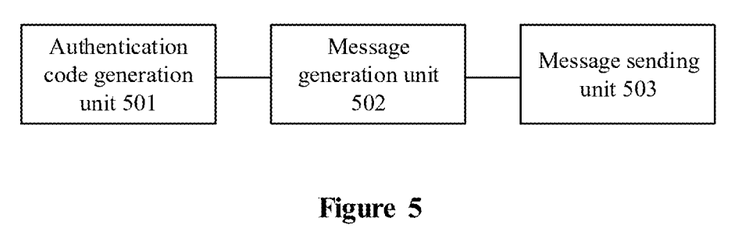
FIG. 5 is a first structural diagram of a wireless access control device for a sender terminal according to the present disclosure.

Reference is made to FIG. 5, which is a first structural diagram of a wireless access control device for a sender terminal according to the present disclosure. The device shown in FIG. 5 may be applied to the sender terminal. As shown in FIG. 5, the device may include an authentication code generation unit 501, a message generation unit 502 and a message sending unit 503.

The authentication code generation unit 501 is configured to generate, when control-type data is sent, an authentication code according to a protocol negotiated with a receiver. The message generation unit 502 is configured to combine the control-type data, the authentication code and a corresponding CRC check code to generate a message. The message sending unit 503 is configured to send the message to the receiver. In this case, the receiver firstly performs a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

Preferably, the authentication code generation unit includes: a first authentication code generation subunit configured to generate, when the control-type data is sent, an authentication code based on data which is set in the protocol negotiated with the receiver; a second authentication code generation subunit configured to generate, when the control-type data is sent, an authentication code by calculating with the control-type data, based on an authentication algorithm and an authentication key which are both set in the protocol negotiated with the receiver; a third authentication code generation subunit configured to generate, when the control-type data is sent, an authentication code by calculating with a received authentication random number, based on an authentication algorithm and an authentication key which are both set in the protocol negotiated with the receiver, where the authentication random number is broadcasted by a base station or a relay station according to a preset rule; or a fourth authentication code generation subunit configured to generate, when the control-type data is sent, an authentication code by calculating with a received authentication random number and the received control-type data, based on an authentication algorithm and an authentication key which are both set in the protocol negotiated with the receiver, where the authentication random number is broadcasted by a base station or a relay station according to a preset rule.

Preferably, the message generation unit includes:

a first message generation subunit configured to store the authentication code by occupying a bit of the control-type data in a message to be generated, generate a CRC check code based on the control-type data and/or the authentication code, and combine the control-type data, the authentication code and the CRC check code to generate the message; or a second message generation subunit configured to generate a CRC check code for the control-type data based on the control-type data and combine the control-type data and the CRC check code for the control-type data to generate a message, and generate a CRC check code for the authentication code based on the authentication code and combine the authentication code and the CRC check code for the authentication code to generate a message.

Preferably, the first message generation subunit is configured to store the authentication code by occupying preset bits of a source ID and a target ID in a message to be generated, generate the CRC check code based on the control-type data and/or the authentication code, and combine the control-type data, the authentication code and the CRC check code to generate the message.

Preferably, the first message generation subunit is configured to store the authentication code by occupying a bit of a source ID in a message to be generated, generate the CRC check code based on the control-type data and/or the authentication code, and combine the control-type data, the authentication code and the CRC check code to generate the message.

Preferably, the first message generation subunit is configured to store the authentication code by occupying a preset bit of data in a message to be generated, generate the CRC check code based on the control-type data and/or the authentication code, and combine the control-type data, the authentication code and the CRC check code to generate the message.

Figure 6:
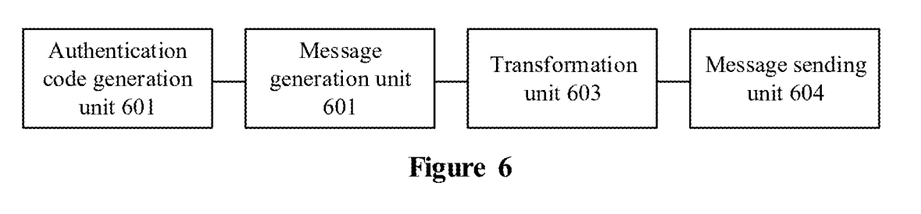
FIG. 6 is a second structural diagram of a wireless access control device for a sender terminal according to the present disclosure.

Reference is made to FIG. 6, which is a second structural diagram of a wireless access control device for a sender terminal according to the present disclosure. In FIG. 6, a transformation unit is added into the device shown in FIG. 5. The device includes an authentication code generation unit 601, a message generation unit 602, a transformation unit 603 and a message sending unit 604.

The authentication code generation unit 601 is configured to generate, when control-type data is sent, an authentication code according to a protocol negotiated with a receiver.

The message generation unit 602 is configured to combine the control-type data, the authentication code and a corresponding CRC check code to generate a message.

The transformation unit 603 is configured to perform a data transformation on a data portion in the message generated by the message generation unit, according to a transformation algorithm negotiated with the receiver, and generate a transformation message by combining the transformed data and the CRC check code in the message.

The message sending unit 604 is configured to send the transformation message to the receiver. In this case, the receiver firstly performs an inverse transformation on a data portion in the received transformation message according to the negotiated transformation algorithm, performs a CRC check based on the inversely-transformed data, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

Figure 7:
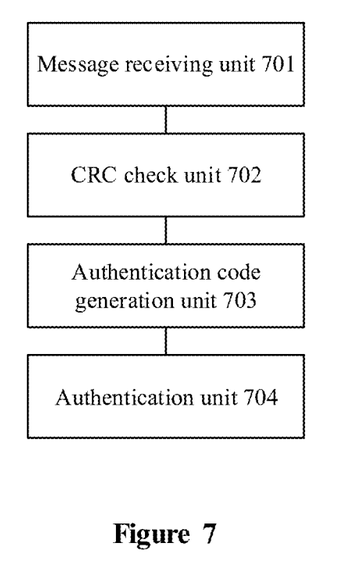
FIG. 7 is a structural diagram of a wireless access control device for a receiver terminal according to the present disclosure.

Reference is made to FIG. 7, which is a structural diagram of a wireless access control device for a receiver terminal according to the present disclosure. As shown in FIG. 7, the device may include a message receiving unit 701, a CRC check unit 702, an authentication code generation unit 703 and an authentication unit 704.

The message receiving unit 701 is configured to receive a message sent by a sender. The message carries control-type data, an authentication code and a corresponding CRC check code.

The CRC check unit 702 is configured to perform a CRC check on the message, and trigger an authentication code generation unit and an authentication unit if the CRC check is successful.

The authentication code generation unit 703 is configured to generate an authentication code according to a protocol negotiated with the sender.

The authentication unit 704 is configured to determine whether the generated authentication code is the same as the authentication code in the received message, analyze the control-type data in the received message if the generated authentication code is the same as the received authentication code, and discard the received control-type data if the generated authentication code is not the same as the received authentication code.

Preferably, the CRC check unit is configured to generate a CRC check code based on data in the message according to the protocol negotiated with the sender, determine whether the generated CRC check code is the same as the CRC check code in the message, and determine that the CRC check is successful if the generated CRC check code is the same as the CRC check code in the message.

Preferably, the authentication code generation unit includes:

a first authentication code generation subunit configured to generate the authentication code based on data which is set in the protocol negotiated with the sender;

a second authentication code generation subunit configured to generate the authentication code by calculating with the control-type data, based on an authentication algorithm and an authentication key which are both set in the protocol negotiated with the sender;

a third authentication code generation subunit configured to generate the authentication code by calculating with a received authentication random number, based on an authentication algorithm and an authentication key which are both set in the protocol negotiated with the sender, where the authentication random number is broadcasted by a base station or a relay station according to a preset rule; or a fourth authentication code generation subunit configured to generate the authentication code by calculating with a received authentication random number and the received control-type data, based on an authentication algorithm and an authentication key which are both set in the protocol negotiated with the sender, where the authentication random number is broadcasted by a base station or a relay station according to a preset rule.

Preferably, if a message sent from the sender which is received by the terminal is a transformation message, the CRC check unit is configured to perform an inverse transformation on a data portion in the received transformation message according to a transformation algorithm negotiated with the sender, and perform a CRC check based on the inversely-transformed data.

It can be seen from the above embodiment that, in the present disclosure, in the way that the terminal actively sends the authentication code, the system can authenticate the terminal in real time when communicating with the terminal. Although an unqualified terminal has the same ID as the qualified terminal, the unqualified terminal cannot obtain the terminal-active-initiating authentication mechanism and cannot know both generation and sending ways of the authentication code. Therefore, in the present disclosure, the unqualified terminal can be prevented from occupying resources and the security of the communication can be ensured. In addition, since the terminal sends the authentication code while sending the control-type information, the authentication process is performed simultaneously with the control-type information processing without separate signaling and overheads. Moreover, a data transformation is performed on a data portion other than a CRC check portion in a message, before the message is sent. In this way, a complexity of the CRC check is increased, thereby increasing the complexity of the whole authentication process and further improving the reliability of the authentication.

Figure 8:
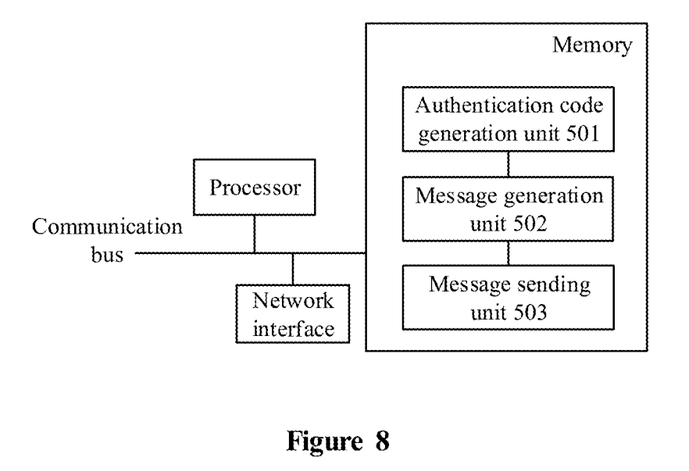
FIG. 8 is a schematic diagram of a hardware structure of a wireless access control device for a sender terminal according to the present disclosure.
Figure 9:
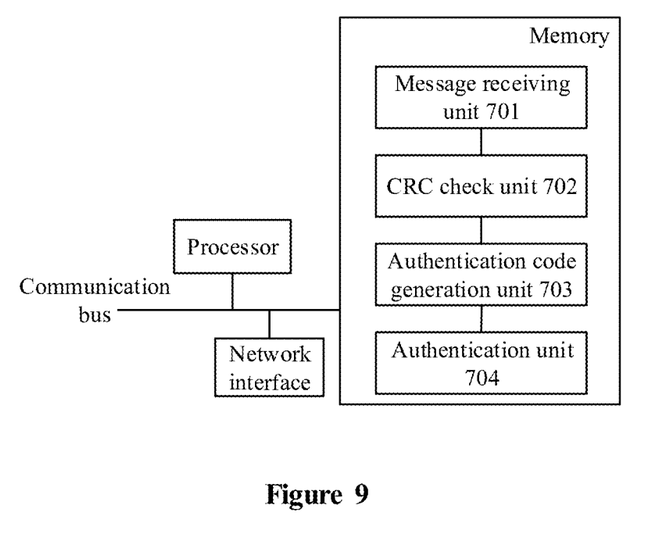
FIG. 9 is a schematic diagram of a hardware structure of a wireless access control device for a receiver terminal according to the present disclosure.

Furthermore, hardware structures of wireless access control devices for both the sender terminal and the receiver are further provided according to an embodiment of the present disclosure. The hardware structures of the wireless access control devices for both the sender terminal and the receiver are the same. The hardware structure may include at least one processer (such as CPU), at least one network interface or a communication interface, a memory and at least one communication bus for connections and communications between the above components. The processor is configured to execute an executable module, such as a computer program, stored in the memory. The memory may contain a high-speed Random Access Memory (RAM), or may further include a non-volatile memory, for example, at least one magnetic disk memory. A gateway of the system may be connected to at least one of other network elements for communication via at least one network interface (may be wired or wireless), by using the Internet, a wide area network, a local area network, a metropolitan area network and the like.

Reference is made to FIG. 8. In some embodiments, program instructions are stored in the memory of the wireless access control device for the sender terminal, which may be executed by the processor. The program instructions may include an authentication code generation unit, a message generation unit and a message sending unit, and may further include a transformation unit. For implementations of the units, one may refer to units shown in FIG. 5 and FIG. 6, and the implementations not described herein.

Reference is made to FIG. 9. In some embodiments, program instructions are stored in the memory of the wireless access control device for the receiver, which may be executed by the processor. The program instructions may include a message receiving unit 701, a CRC check unit 702, an authentication code generation unit 703 and an authentication unit 704. For implementations of the units, one may refer to units shown in FIG. 7, and the implementations are not described herein.

It should be noted that, in an actual application, the terminal has both a sending function and a receiving function. In this case, the terminal may include both the devices shown in FIG. 8 and FIG. 9. Practically, some terminals with only the sending function or the receiving function may only include the device shown in FIG. 8 or the device shown in FIG. 9.

It may be understood that, the present disclosure may be applied in many general-purpose or special-purpose computing system environments or configurations, such as a personal computer, a server computer, a handheld device or portable device, a tablet-type device, a multi-processor system, a microprocessor-based system, a set-top box, a programmable consuming electronic device, a network PC, a minicomputer, a mainframe computer and a distributed computing environment including any of the above systems or devices. The present disclosure may be described in the general context of computer executable instructions executed by a computer, such as a program module. Generally, the program module includes routines, programs, objects, components, data structures and the like performing a specific task or implementing a specific abstract data type. The present disclosure may be also practiced in distributed computing environments. In these distributed computing environments, the task is performed by a remote processing device connected to a communication network. In these distributed computing environments, the program module may be stored in a storage medium of local and remote computers, including a storage device. It should be noted that, the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including many elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

Since the device embodiments correspond to the method embodiments, for relevant matters, references may be made to the description of the method embodiments. The device embodiments described above are only schematic, units described as separate components may be separated physically or not, and a component displayed as a unit may be a physical unit or not, that is, the component may be placed in a same position or may be distributed in multiple network units. A part of or all modules may be selected as needed to realize the object of the solutions of the embodiments. Those skilled in the art can understand and implement the present disclosure without any creative work.

Those described above are only specific embodiments of the disclosure. It should be noted that, for those skilled in the art, improvements and modifications may also be made without departing from the principle of the present disclosure. Those improvements and modifications should also be included in the scope of protection of the present disclosure.

The invention claimed is:

1. A wireless access control method, applied to a sender terminal, comprising:

generating, by the terminal, an authentication code according to a protocol negotiated with a receiver, when the terminal sends control-type data;

combining, by the terminal, the control-type data, the authentication code and a corresponding CRC check code to generate a message; and sending, by the terminal, the message to the receiver; wherein the receiver firstly performs a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code, wherein the combining, by the terminal, the control-type data, the authentication code and the corresponding CRC check code to generate the message comprises:

storing, by the terminal, the authentication code by occupying a bit of the control-type data in a message to be generated, generating, by the terminal, a CRC check code based on the control-type data and/or the authentication code, and combining, by the terminal, the control-type data, the authentication code and the CRC check code to generate the message; or generating, by the terminal, a CRC check code for the control-type data based on the control-type data and combining, by the terminal, the control-type data and the CRC check code for the control-type data to generate a message, and generating, by the terminal, a CRC check code for the authentication code based on the authentication code and combining, by the terminal, the authentication code and the CRC check code for the authentication code to generate a message;

wherein the storing, by the terminal, the authentication code by occupying the bit of the control-type data in the message to be generated, generating, by the terminal, the CRC check code based on the control-type data and/or the authentication code, and combining, by the terminal, the control-type data, the authentication code and the CRC check code to generate the message comprises:

storing, by the terminal, the authentication code by occupying preset bits of a source ID and a target ID in the message to be generated, generating, by the terminal, the CRC check code based on the control-type data and/or the authentication code, and combining, by the terminal, the control-type data, the authentication code and the CRC check code to generate the message;

storing, by the terminal, the authentication code by occupying a bit of a source ID in the message to be generated, generating, by the terminal, the CRC check code based on the control-type data and/or the authentication code, and combining, by the terminal, the control-type data, the authentication code and the CRC check code to generate the message; or storing, by the terminal, the authentication code by occupying a preset bit of data in the message to be generated, generating, by the terminal, the CRC check code based on the control-type data and/or the authentication code, and combining, by the terminal, the control-type data, the authentication code and the CRC check code to generate the message.

2. The method according to claim 1, wherein the generating, by the terminal, the authentication code according to the protocol negotiated with the receiver, when the terminal sends the control-type data comprises:

generating, by the terminal, the authentication code based on data which is set in the protocol negotiated with the receiver, when the terminal sends the control-type data;

generating, by the terminal, the authentication code by calculating with the control-type data, based on an authentication algorithm and an authentication key which are both set in the protocol negotiated with the receiver, when the terminal sends the control-type data;

generating, by the terminal, the authentication code by calculating with a received authentication random number, based on an authentication algorithm and an authentication key which are both set in the protocol negotiated with the receiver, when the terminal sends the control-type data, wherein the authentication random number is broadcasted by a base station or a relay station according to a preset rule; or generating, by the terminal, the authentication code by calculating with a received authentication random number and the received control-type data, based on an authentication algorithm and an authentication key which are both set in the protocol negotiated with the receiver, when the terminal sends the control-type data, wherein the authentication random number is broadcasted by a base station or a relay station according to a preset rule.

3. The method according to claim 1, wherein after the combining, by the terminal, the control-type data, the authentication code and the corresponding CRC check code to generate the message, the method further comprises:

performing, by the terminal, a data transformation on a data portion in the message according to a transformation algorithm negotiated with the receiver, and generating, by the terminal, a transformation message by combining the transformed data and the CRC check code in the message; and wherein the sending the message to the receiver comprises:

sending the transformation message to the receiver, wherein the receiver firstly performs an inverse transformation on a data portion in the received transformation message according to the negotiated transformation algorithm, performs a CRC check based on the inversely-transformed data, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

4. A wireless access control device, applied to a sender terminal, comprising:

an authentication code generation unit configured to generate, when control-type data is sent, an authentication code according to a protocol negotiated with a receiver;

a message generation unit configured to combine the control-type data, the authentication code and a corresponding CRC check code to generate a message; and a message transmitter configured to send the message to the receiver; wherein the receiver firstly performs a CRC check on the received message, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code, wherein the message generation unit comprises:

a first message generation subunit configured to store the authentication code by occupying a bit of the control-type data in a message to be generated, generate a CRC check code based on the control-type data and/or the authentication code, and combine the control-type data, the authentication code and the CRC check code to generate the message; or a second message generation subunit configured to generate a CRC check code for the control-type data based on the control-type data and combine the control-type data and the CRC check code for the control-type data to generate a message, and generate a CRC check code for the authentication code based on the authentication code and combine the authentication code and the CRC check code for the authentication code to generate a message;

wherein the first message generation subunit is configured to store the authentication code by occupying preset bits of a source ID and a target ID in the message to be generated, generate the CRC check code based on the control-type data and/or the authentication code, and combine the control-type data, the authentication code and the CRC check code to generate the message;

the first message generation subunit is configured to store the authentication code by occupying a bit of a source ID in the message to be generated, generate the CRC check code based on the control-type data and/or the authentication code, and combine the control-type data, the authentication code and the CRC check code to generate the message; or the first message generation subunit is configured to store the authentication code by occupying a preset bit of data in the message to be generated, generate the CRC check code based on the control-type data and/or the authentication code, and combine the control-type data, the authentication code and the CRC check code to generate the message.

5. The device according to claim 4, wherein the authentication code generation unit comprises:

a first authentication code generation subunit configured to generate, when the control-type data is sent, an authentication code based on data which is set in the protocol negotiated with the receiver;

a second authentication code generation subunit configured to generate, when the control-type data is sent, an authentication code by calculating with the control-type data, based on an authentication algorithm and an authentication key which are both set in the protocol negotiated with the receiver;

a third authentication code generation subunit configured to generate, when the control-type data is sent, an authentication code by calculating with a received authentication random number, based on an authentication algorithm and an authentication key which are both set in the protocol negotiated with the receiver, wherein the authentication random number is broadcasted by a base station or a relay station according to a preset rule; or a fourth authentication code generation subunit configured to generate, when the control-type data is sent, an authentication code by calculating with a received authentication random number and the received control-type data, based on an authentication algorithm and an authentication key which are both set in the protocol negotiated with the receiver, wherein the authentication random number is broadcasted by a base station or a relay station according to a preset rule.

6. The device according to claim 4, further comprising:

a transformation unit configured to perform a data transformation on a data portion in the message generated by the message generation unit, according to a transformation algorithm negotiated with the receiver, and generate a transformation message by combining the transformed data and the CRC check code in the message, wherein the message transmitter is configured to send the transformation message to the receiver, wherein the receiver firstly performs an inverse transformation on a data portion in the received transformation message according to the negotiated transformation algorithm, performs a CRC check based on the inversely-transformed data, generates an authentication code according to the negotiated protocol if the CRC check is successful, determines whether the generated authentication code is the same as the received authentication code, analyzes the received control-type data if the generated authentication code is the same as the received authentication code, and discards the received control-type data if the generated authentication code is not the same as the received authentication code.

* * * * *